(12) United States Patent
Chen

(10) Patent No.: US 10,956,134 B2
(45) Date of Patent: Mar. 23, 2021

(54) ITEMIZATION OF RULE BRANCH CONDITION EXPRESSIONS

(71) Applicant: SAP SE, Walldorf (DE)

(72) Inventor: Wei Chen, Shanghai (CN)

(73) Assignee: SAP SE, Walldorf (DE)

(*) Notice: Subject to any disclaimer, the term of this patent is extended or adjusted under 35 U.S.C. 154(b) by 0 days.

(21) Appl. No.: 16/529,943

(22) Filed: Aug. 2, 2019

(65) Prior Publication Data
US 2021/0034341 A1 Feb. 4, 2021

(51) Int. Cl.
*G06F 9/30* (2018.01)
*G06F 8/41* (2018.01)

(52) U.S. Cl.
CPC .......... *G06F 8/433* (2013.01); *G06F 9/30058* (2013.01)

(58) Field of Classification Search
USPC ....................................................... 717/141
See application file for complete search history.

(56) References Cited

U.S. PATENT DOCUMENTS

| | | | |
|---|---|---|---|
| 6,085,029 A * | 7/2000 | Kolawa | G06F 11/3624 714/38.13 |
| 2007/0089103 A1* | 4/2007 | Iborra | G06F 16/2365 717/141 |
| 2009/0106182 A1* | 4/2009 | Yamaoka | G06F 11/3604 706/47 |
| 2017/0090877 A1* | 3/2017 | Hale | G06F 8/65 |
| 2018/0349115 A1* | 12/2018 | Zhang | G06F 8/20 |

* cited by examiner

*Primary Examiner* — John Q Chavis
(74) *Attorney, Agent, or Firm* — Buckley, Maschoff & Talwalkar LLC

(57) ABSTRACT

A system includes determination of a rule branch of a rule, the rule branch comprising a first condition expression including a first condition value, reception of one or more condition values compatible with the first condition expression, and automatic generation of a respective rule branch of the rule for each of the one or more received condition values.

17 Claims, 19 Drawing Sheets

```
IF user.employment.position.level == 'Engineer Level 1'
    SET user.employment.position.title = "Assistant Engineer"
ELSE IF user.employeement.position.paygrade==getPayGrade('Engineer Level 1')
    SET user.employment.position.cost_center = "001"
ELSE IF user.employement.businessUnit == user.manager.employeement.businesUnit
    RAISE(INFO, "same business unit");
```

*FIG. 9*

```
IF user.employment.position.level == 'Engineer Level 1'
    SET user.employment.position.title = "Assistant Engineer"
1610 ⎰ IF user.employment.position.level == 'Engineer Level 2'
     ⎱     SET user.employment.position.title = "Assistant Engineer"
1620 ⎰ IF user.employment.position.level == 'Engineer Level 3'
     ⎱     SET user.employment.position.title = "Assistant Engineer"
ELSE IF user.employeement.position.paygrade==getPayGrade('Engineer Level 1')
    SET user.employment.position.cost_center = "001"
ELSE IF user.employeement.businessUnit == user.manager.employeement.businesUnit
    RAISE(INFO, "same business unit");
```

*FIG. 16*

ITEMIZATION OF RULE BRANCH CONDITION EXPRESSIONS

BACKGROUND

Enterprise software systems receive, generate, and store data related to many aspects of an enterprise. Such systems include applications which provide functionality to users based on the data. Applications may use pre-defined rules to determine whether to execute certain actions. Application rules are typically defined in the format: IF <condition expression> THEN <action>.

A rule may include several IF <condition expression> THEN <action> statements (or branches), each of which is associated with an alternative conditional scenario. FIG. 1 depicts rule 100 including three such branches, in which the <action> statements have been omitted for clarity. The condition expression of each branch specifies a different value of the object user.employment.position.level. Although rule 100 includes only one condition expression per branch, each branch may include multiple condition expressions which define the conditional scenario associated with the branch.

When designing a rule, a rule designer often needs to create rule branches which correspond to each potential value (e.g., "Engineer Level 1", "Engineer Level 2", "Engineer Level 3") of a given object (e.g., "user.employment.position.level"). The rule designer may simply create each rule branch independently. Alternatively, the rule designer may create one branch corresponding to one value (e.g., "Engineer Level 1") of a condition expression, copy the branch to create each other rule branch, and then modify the condition values of the duplicate branches. Although the latter approach may reduce an overall effort required as compared to the former approach, both approaches are inefficient and error-prone. For example, in addition to the time required to construct each branch, it is necessary to confirm that all possible condition values are represented by one and only one branch. Also, the overall effort required increases sharply if each rule branch includes more than one condition expression. Efficient systems for generating rule branches corresponding to multiple condition values are desired.

BRIEF DESCRIPTION OF THE DRAWINGS

FIG. 9 illustrates a rule according to some embodiments.

FIG. 16 illustrates an updated rule including rule branches with itemized condition expressions according to some embodiments.

DETAILED DESCRIPTION

The following description is provided to enable any person in the art to make and use the described embodiments. Various modifications, however, will remain readily-apparent to those in the art.

Generally, some embodiments creation of rule branches including different condition values within their respective condition expressions. According to some embodiments, a rule designer simply selects the desired condition values and the rule branches are generated based thereon. Some embodiments may therefore allow a designer to avoid the above-described copying/pasting/modifying/checking paradigm.

According to some embodiments, a rule branch of a rule is initially selected. Next, it is determined whether the selected rule branch includes an itemizable condition expression. In some embodiments, a condition expression is considered itemizable if its condition value may be substituted with at least one other condition value. The designer then selects one or more condition values of the itemizable condition expression. In response, a rule branch is created for each selected condition value.

Figure 1:
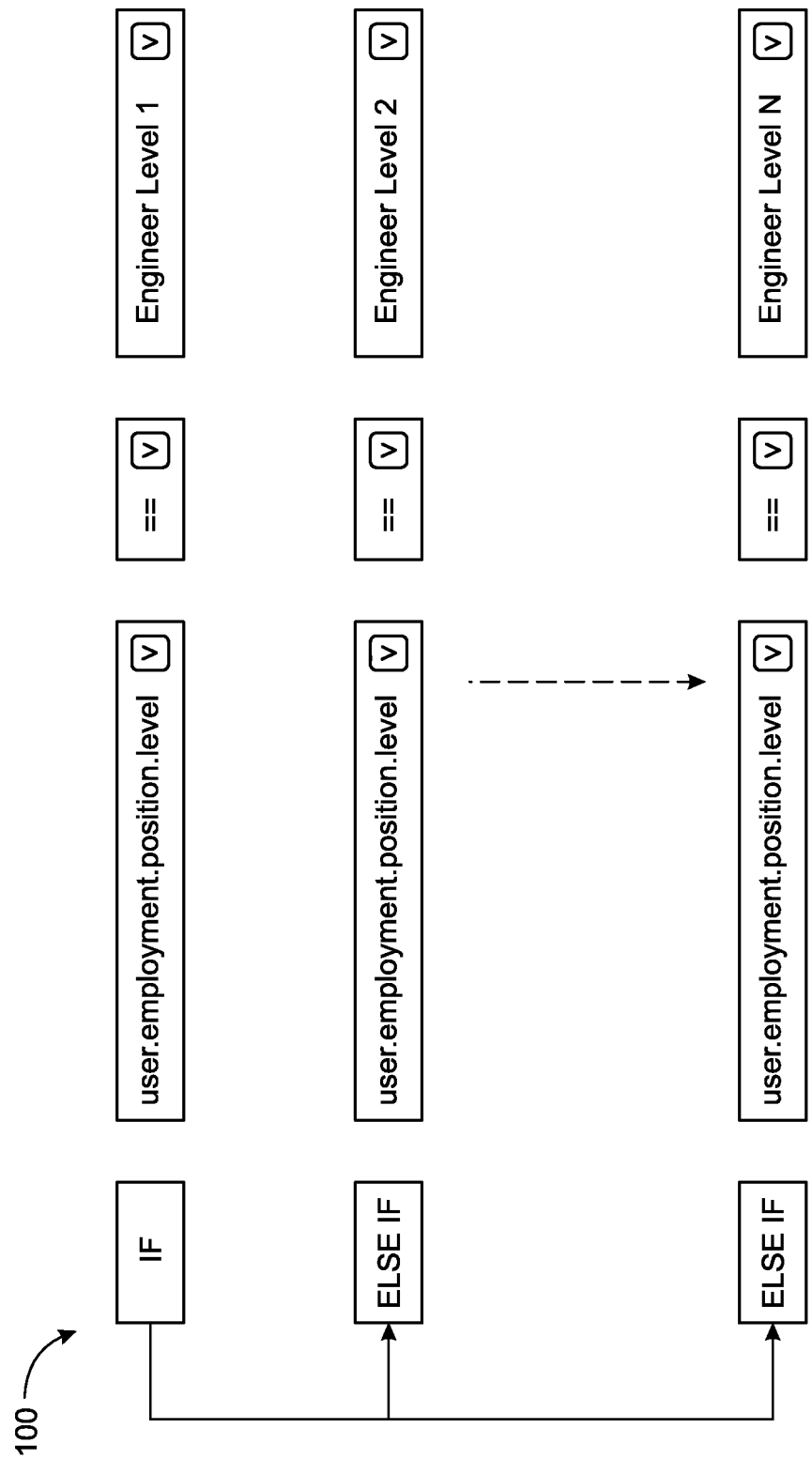
FIG. 1 illustrates a rule including branches and condition expressions within each branch.
Figure 2:
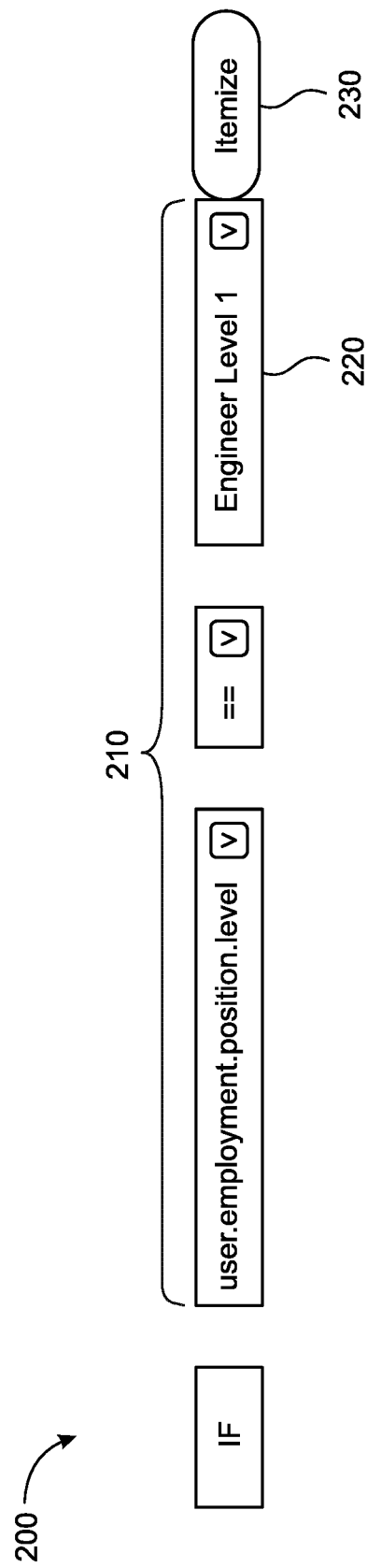
FIG. 2 illustrates a rule branch including an itemizable condition expression according to some embodiments.

FIG. 2 illustrates rule 200 including a single rule branch and represented in a design interface of a rule designer application. Again, <action> statements of rule 200 have been omitted for clarity. Rule 200 includes condition expression 210 including condition expression value 220. Specifically, condition expression 210 is "user.employment.position.level=Engineer Level 1". According to some embodiments, and as will be described in detail below, it has been determined that condition expression 210 is itemizable. Itemize control 230 is therefore presented adjacent to condition value 220.

Figure 3:
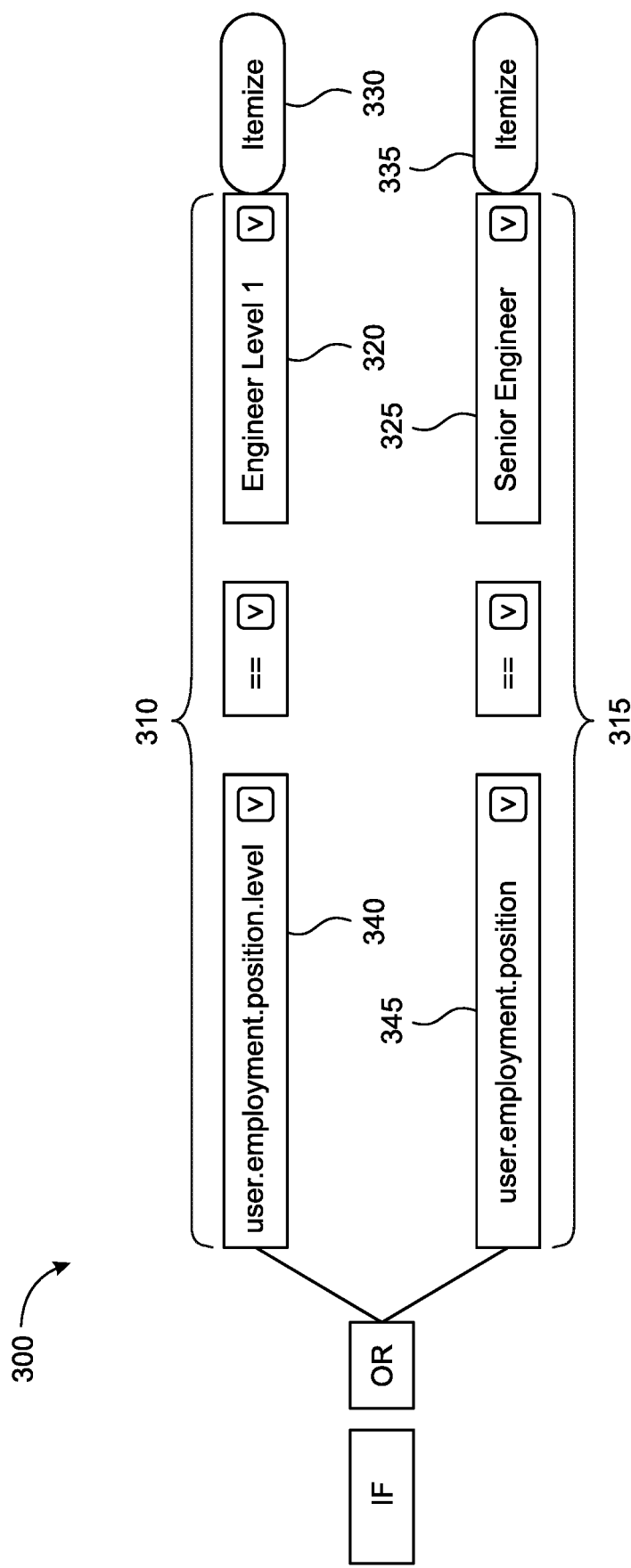
FIG. 3 illustrates a rule branch including two itemizable condition expressions according to some embodiments.

FIG. 3 illustrates a rule branch of rule 300 including two condition expressions. Condition expression 310 includes condition expression value 320 of object 340 and condition expression 315 includes condition expression value 325 of object 345. Itemize controls 330 and 335 indicate that condition expressions 310 and 315 have been determined to be itemizable.

Figure 4:
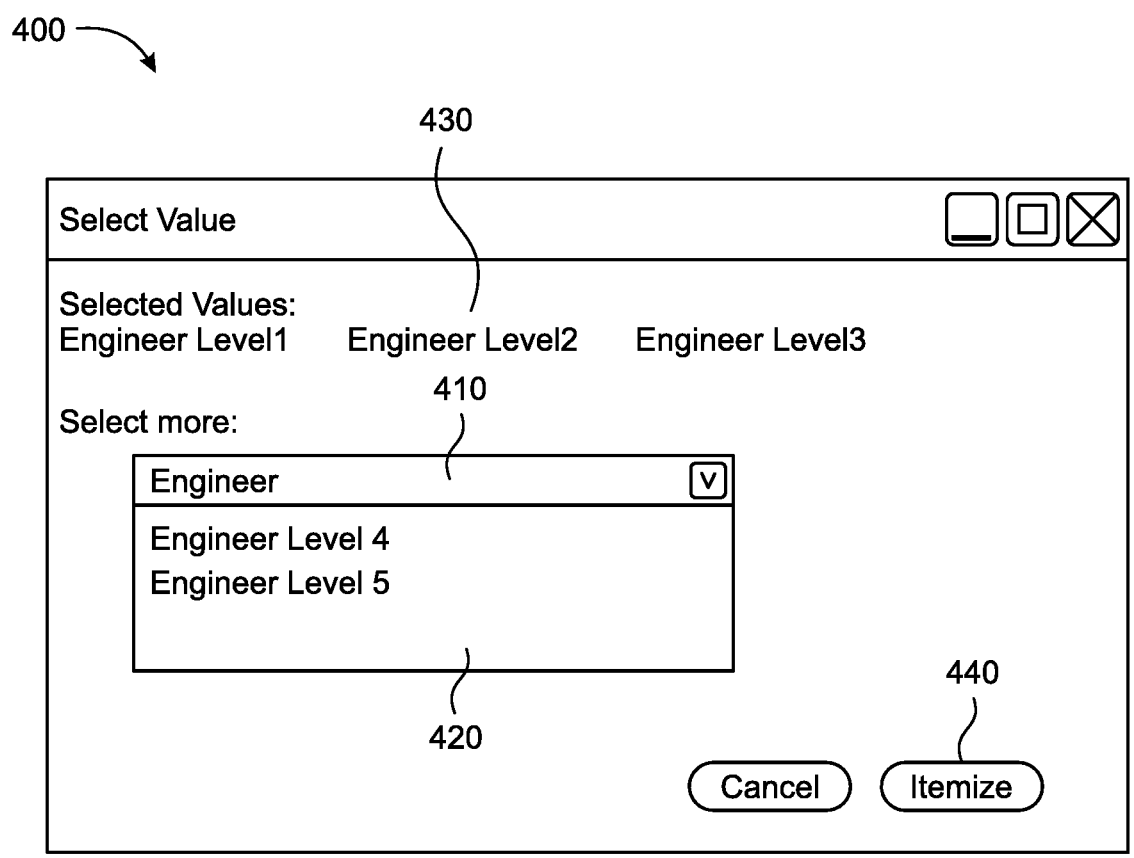
FIG. 4 is a user interface for receiving condition values for itemizable condition expressions according to some embodiments.

A rule designer may select one itemizable condition expression using a control such as control 230, control 330 or control 335. In response, the rule designer application may allow the rule designer to select and/or input one or more condition values associated with the itemizable condition expression. For example, user interface 400 of FIG. 4 includes input field 410 into which a user may input a condition value. Based on the input value, drop-down menu 420 may be displayed including matching condition values. The matching condition values may be determined using auto-complete techniques based on known possible condition values corresponding to the selected condition expression and on text input into field 410.

As shown, the rule designer has selected three condition values 430. One of condition values 430 is "Engineer Level 1" of the original rule branch. The rule designer selects itemize control 430 once all desired condition values are selected. Specifically, for each selected condition value, a new rule branch is created which includes the selected condition expression and a selected condition value.

Figure 5:
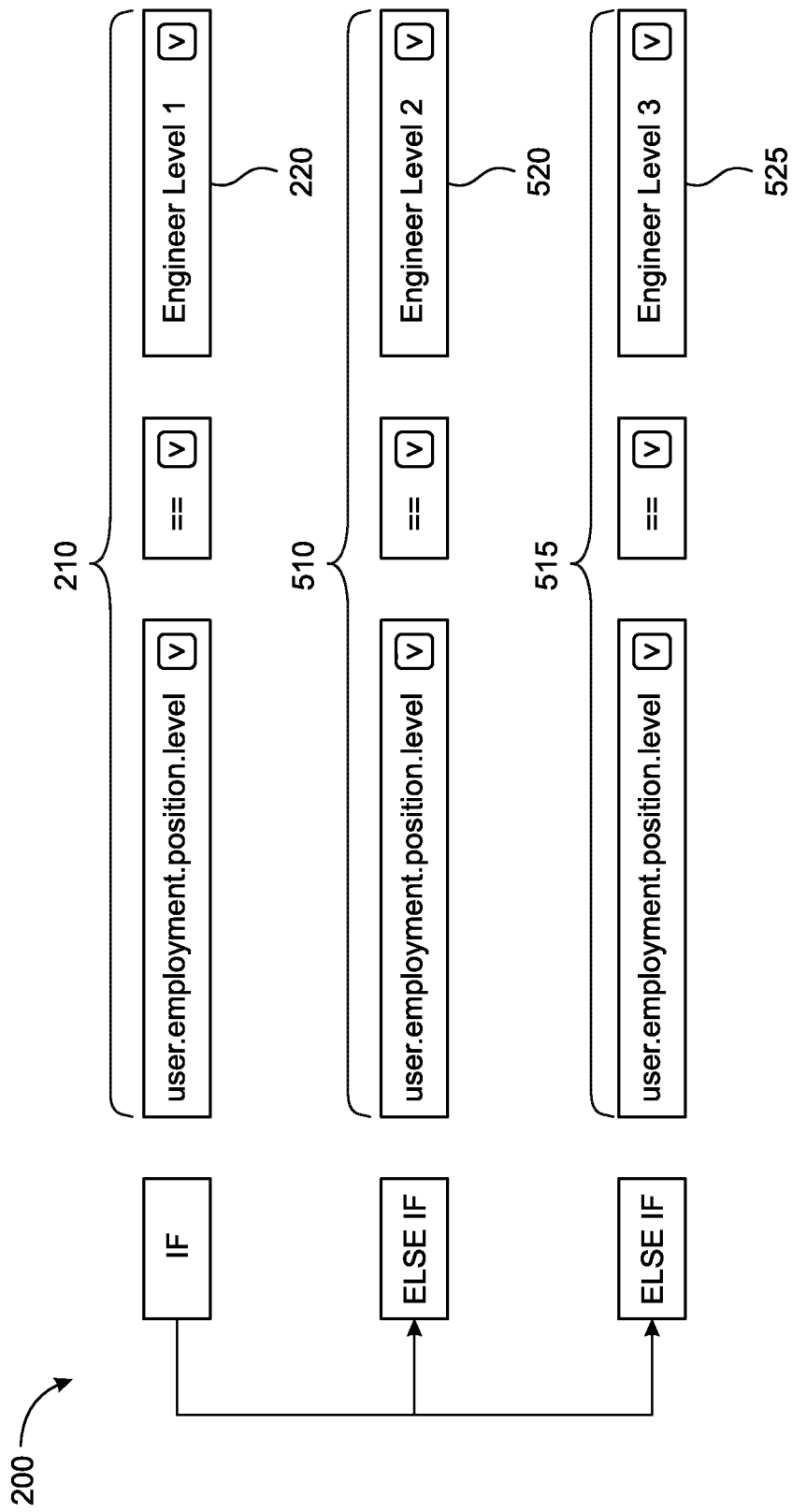
FIG. 5 illustrates rule branches of a rule generated based on an itemizable condition expression according to some embodiments.

FIG. 5 illustrates rule 200 after creation of new rule branches based on selected condition values 430. Rule 200 of FIG. 5 includes original rule branch 210 including condition value "Engineer Level 1", and branches 510 and 515 including condition values "Engineer Level 2" and "Engineer Level 3".

Figure 6:
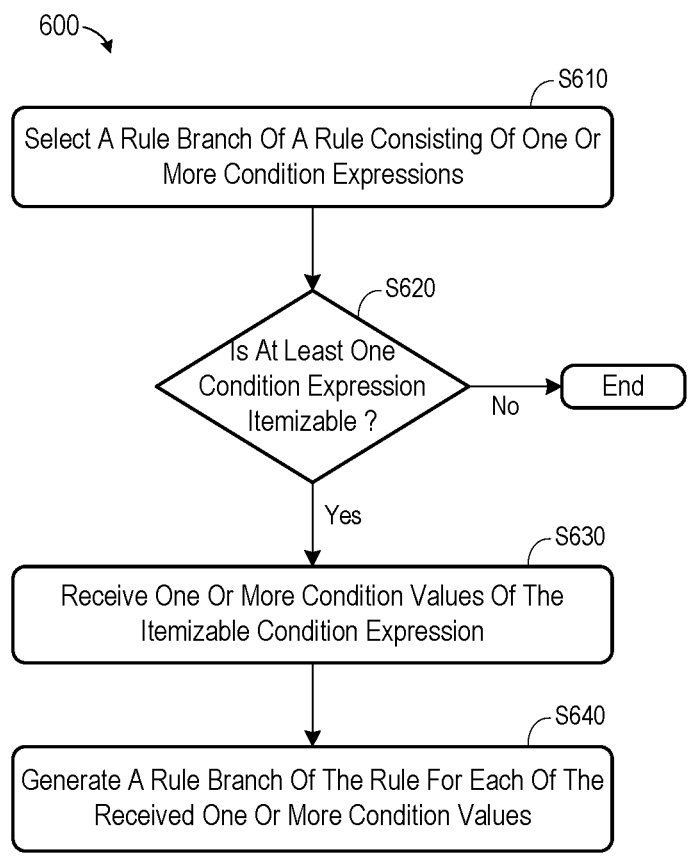
FIG. 6 is a flow diagram of a process to generate one or more rule branches of a rule based on an itemizable condition expression and specified condition values according to some embodiments.

FIG. 6 comprises a flow diagram of process 600 to itemize a rule branch condition expression according to some embodiments. In some embodiments, various hardware elements execute program code to perform process 600. Process 600 and all other processes mentioned herein may be embodied in computer-executable program code read from one or more of non-transitory computer-readable media, such as a non-volatile random access memory, a hard disk, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S610, a rule branch of a rule is selected. The rule branch includes one or more condition expressions. For example, a rule designer may operate a rule designer application to access or to create a rule including a rule branch. For purposes of example, it will be assumed that rule 200 is selected at S610, including a single rule branch and condition expression 210.

Next, at S620, it is determined whether any of the one or more condition expressions of the selected rule branch is itemizable. The determination at S620 according to some embodiments will be described below. Process 600 terminates if none of the one or more condition expressions of the selected rule branch is determined to be itemizable. Accordingly, design of the rule then continues in any suitable known manner.

Flow proceeds from S620 to S630 if it is determined that any of the one or more condition expressions is itemizable. At S630, one or more condition values of an itemizable condition expressions is received. In some embodiments, condition values which are compatible with the condition expression are presented to the rule designer and the rule designer selects values therefrom. Such condition values may be presented and selected via a user interface such as interface 400 of FIG. 4.

One rule branch of the rule is generated at S640 for each of the received one or more condition values. FIG. 5 illustrates generation of new rule branches at S640 based on selected condition values 430. As mentioned above, rule branches 510 and 515 have been generated including condition values "Engineer Level 2" and "Engineer Level 3".

Figure 7:
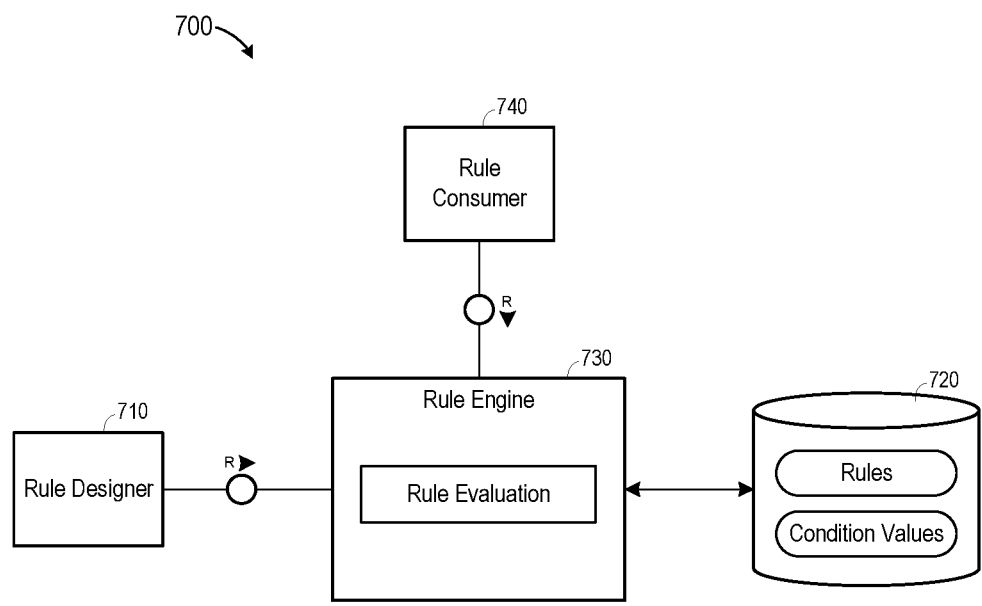
FIG. 7 is a block diagram of a system architecture according to some embodiments.

FIG. 7 is a block diagram of system 700 according to some embodiments. System 700 may implement processes as described herein.

System 700 includes rule designer 710, storage 720, rule engine 730 and rule consumer 740. Rule designer 710 may comprise an application allowing a user to create rules to guide application execution. Such rules may be stored in storage 720. A rule may include two or more branches and one or more condition expressions per branch. Moreover, each branch may be associated with an action to be performed if all condition expressions of the branch are evaluated as TRUE.

Rule designer 710 may operate as described herein to facilitate generation of rule branches based on itemizable condition expressions and associated condition values. For example, rule designer 710 may comprise program code executable to perform process 600. In this regard, storage 720 includes condition values associated with various condition expressions, and rule designer 710 may access these condition values in order to present suitable condition values to a user for selection, for example as described with respect to FIG. 4.

At runtime, rule consumer 740 may submit a request to rule engine 730 to evaluate a rule stored in storage 710. Evaluation of a rule may include evaluation of the conditions and branches of the rule to determine one or more actions to be performed. For example, rule engine 730 may perform the determined action(s), return the action(s) to rule consumer 740 for performance, or request another component to perform the action.

Rule engine 730 may be a service, in which case rule consumer 740 may comprise a separate application. Rule engine 730 may alternatively be integrated within an application, in which case rule consumer 740 may comprise another component of the application.

System 700 may be implemented using any architecture that is or becomes known, including but not limited to distributed, on-premise, cloud-based and hybrid architectures. Embodiments are not limited to system 700 or to a database architecture. Each component of system 700 may be implemented at least in part in computer hardware, in program code and/or in one or more computing systems executing such program code as is known in the art. Such a computing system may include one or more processing units which execute processor-executable program code stored in a memory system.

The following describes the determination of whether a condition expression is itemizable according to some embodiments. A condition expression is a Boolean expression which produces a Boolean value when evaluated. A rule branch is defined as: IF <Boolean-expression> THEN <action-expression>. The Boolean expression is then defined in Backus-Naur form as:

<boolean-expression>::=<boolean-term> [OR <boolean-term>]*
<boolean-term>::=<not-factor> [AND <not-factor>]*
<not-factor>::=[NOT]<boolean-factor>

<boolean-factor>::=<boolean-constant> |<boolean-variable>| <boolean_function>|<comparison_expression>
<comparison_expression>::=<expression><comparison operator><expression>
<expression>::=<function call expression>|<path expression><value expression>|<mathematic expression>|<other expression>

Embodiments may particularly consider the value expression of an expression. The value expression is defined as: <value expression>::=literal string literal number. In the value expression, a literal string may represent a unique object in a specific context. For example, a literal string could be a username of an IT account which uniquely refers to a user's account. The literal string may be numeric, as in the case where the user's IT account is assigned a unique sequence number.

In the example of FIG. 2, the string "Engineer Level 1" is a literal string which uniquely refers to a position level object defined in a system. However, whether or not the literal value refers to an object may be decided in the context in which the literal value is placed. According to some embodiments, literal value is treated as an object when:

1) The literal value is the left or right expression of a comparison expression, and the target with which the literal value is to be compared is an object. For example, in condition expression 210 (i.e., user.employment.position. level="Engineer Level 1"), the literal string "Engineer Level 1" refers to an object entity; and 2) The literal value is the argument of a function in a function call expression, and the type of the argument is an object. For example, "Engineer Level 4" refers to a job position level rather than its literal meaning in the function call expression "getPayGrade('Engineer Level 4')" of the branch IF user.employment.position.payGrade=getPayGrade('Engineer Level 4').

In some embodiments, a rule branch may be determined to be itemizable if the rule branch satisfies the following criterion: 1) The IF portion of the rule branch includes at least one value expression which refers to an object; and 2) The object type of the value expression is listable. If so, the rule designer application user interface may present a list of objects which match a user's input. If no user input exists, then the list includes all condition values corresponding to the value expression.

In a particular example, "Engineer Level 1" of rule branch 210 is a value expression. Moreover, the object type of the value expression "Engineer Level 1" is itemizable, because the levels of engineer are listable. For example, the search term "Engineer" may be used to retrieve other suitable condition values.

Figure 8:
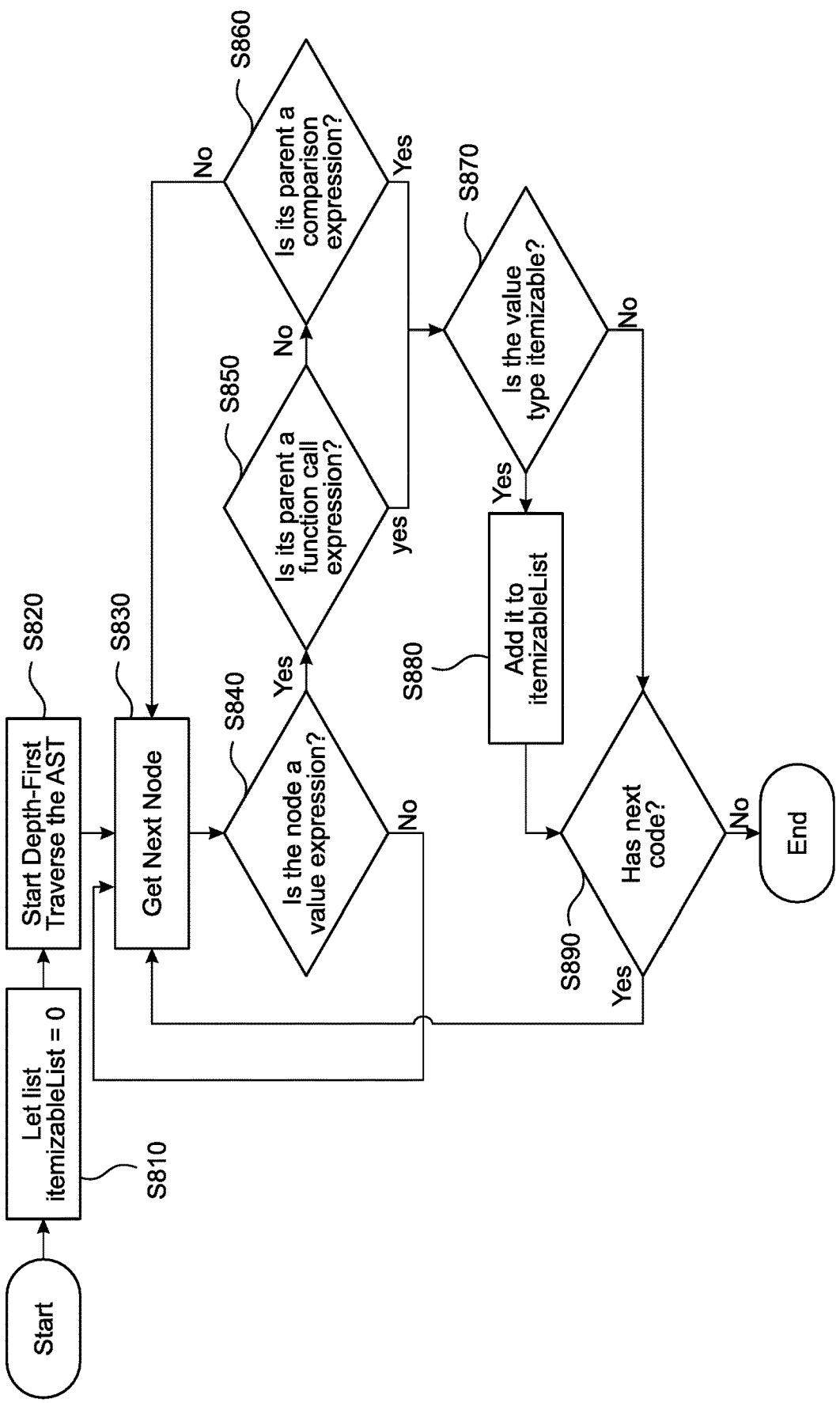
FIG. 8 is a flow diagram of a process to determine whether a condition expression is itemizable according to some embodiments.

FIG. 8 is a flow diagram of a process to determine whether a condition expression of a rule branch is itemizable. The process assumes that the rule branch has been parsed to construct an abstract syntax tree (AST) as is known in the art.

Initially, at S810, a list is created for collecting itemizable expressions. Next, at S820, the AST is traversed depth-first from the first node of the rule branch. A next node of the depth-first traversal path is retrieved at S830.

At S840, it is determined whether the node is a value expression. If not, flow returns to S830 to retrieve a next node. If so, it is determined whether the value expression's parent is a function call expression (S850) or a comparison expression (S860). If neither, flow returns to S830.

Figure 10:
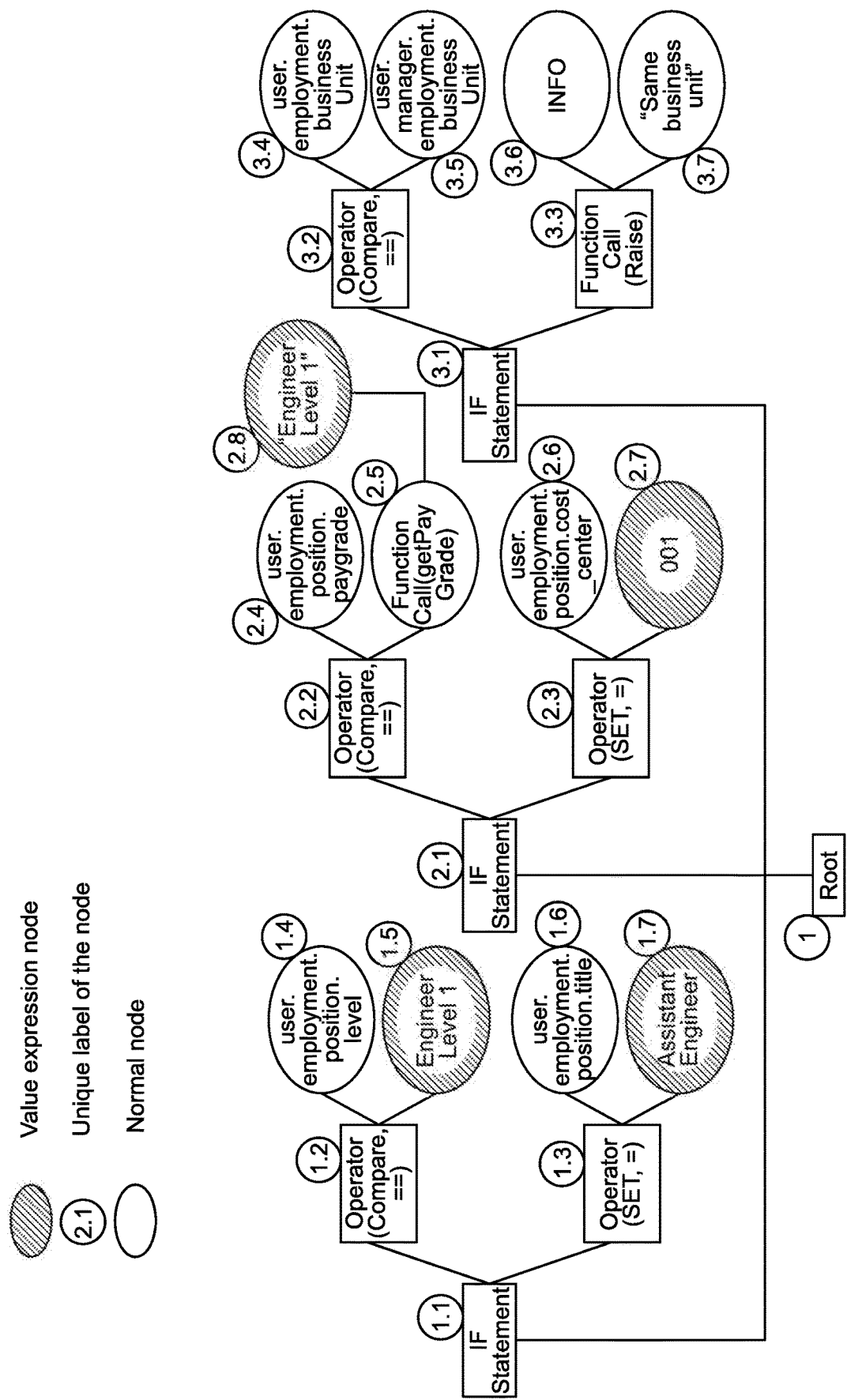
FIG. 10 depicts an abstract syntax tree of the FIG. 9 rule according to some embodiments.

Flow proceeds to S870 if the value expression's parent is a function call expression or a comparison expression. At S870, it is determined whether the value type of the value expression is itemizable. If so, the value expression is added to the list created at S810 and flow proceeds to S890 to determine whether a next node in the traversal path exists. If so, flow returns to S830 and continues as described above. If not, flow terminates. The rule branch is determined to be itemizable if the list is not empty upon termination, FIGS. 9 through 13 illustrate an example of the FIG. 8 process according to some embodiments. Specifically, FIG. 9 illustrates an example rule to be analyzed according to the FIG. 8 process. The FIG. 9 rule includes three branches, each of which includes a different type of condition expression and corresponding condition value. FIG. 10 illustrates the AST of the FIG. 9 rule.

Figure 11:
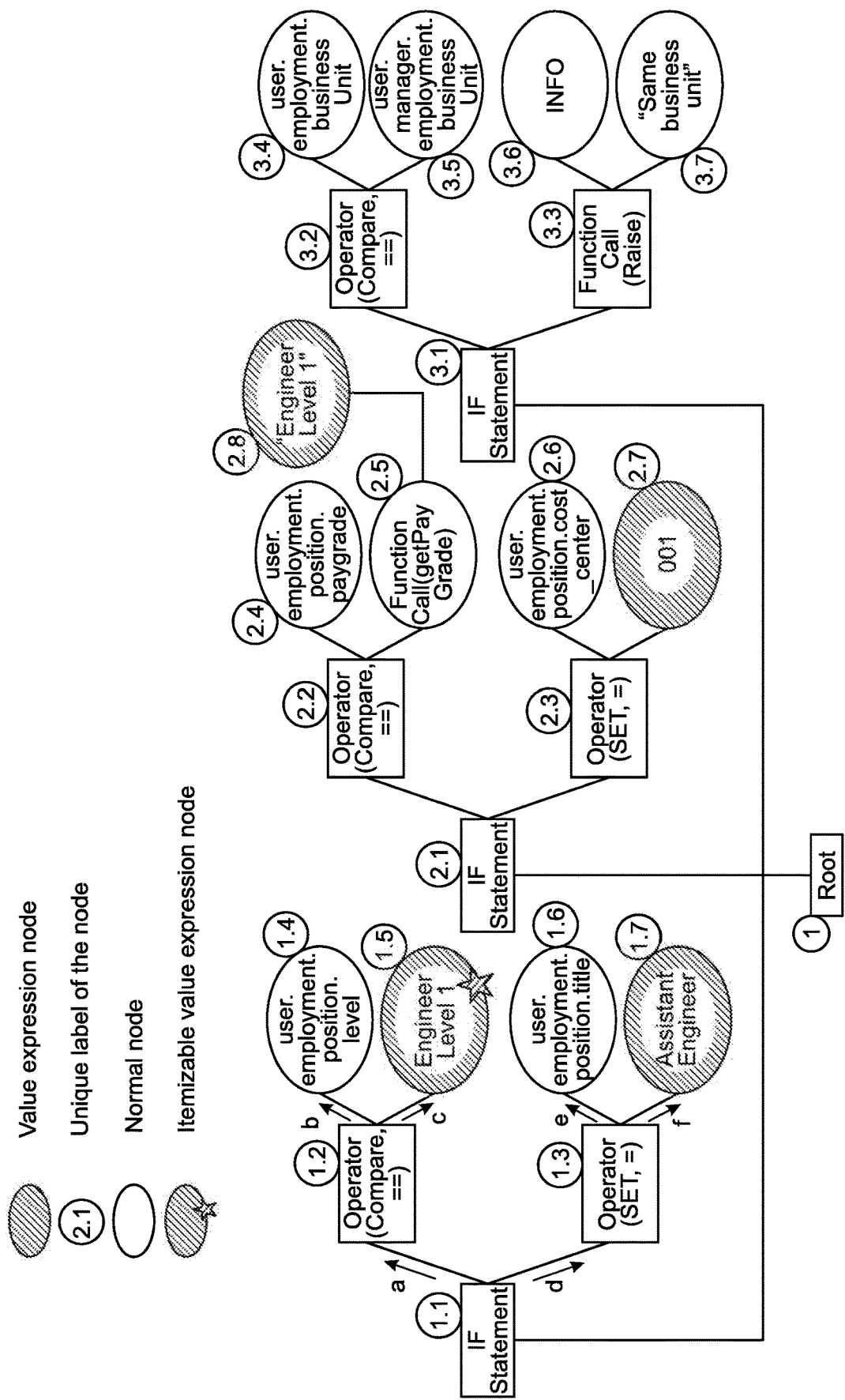
FIG. 11 depicts traversal of the FIG. 10 abstract syntax tree based on the FIG. 8 process according to some embodiments.

According to the FIG. 8 process, the first branch of the AST is traversed along the path (a,b,c,d,e,f) as shown in FIG. 11. Node 1.5 includes a literal value (Engineer Level 1'), its type is listable, and its parent node 1.2 is a comparison node. Accordingly, the value expression of node 1.5 is itemizable. Node 1.7 is not an itemizable value expression because, although it is a value expression, its parent node 1.3 is an assignment node. Accordingly, the list is not empty and the first rule branch is itemizable.

Figure 12:
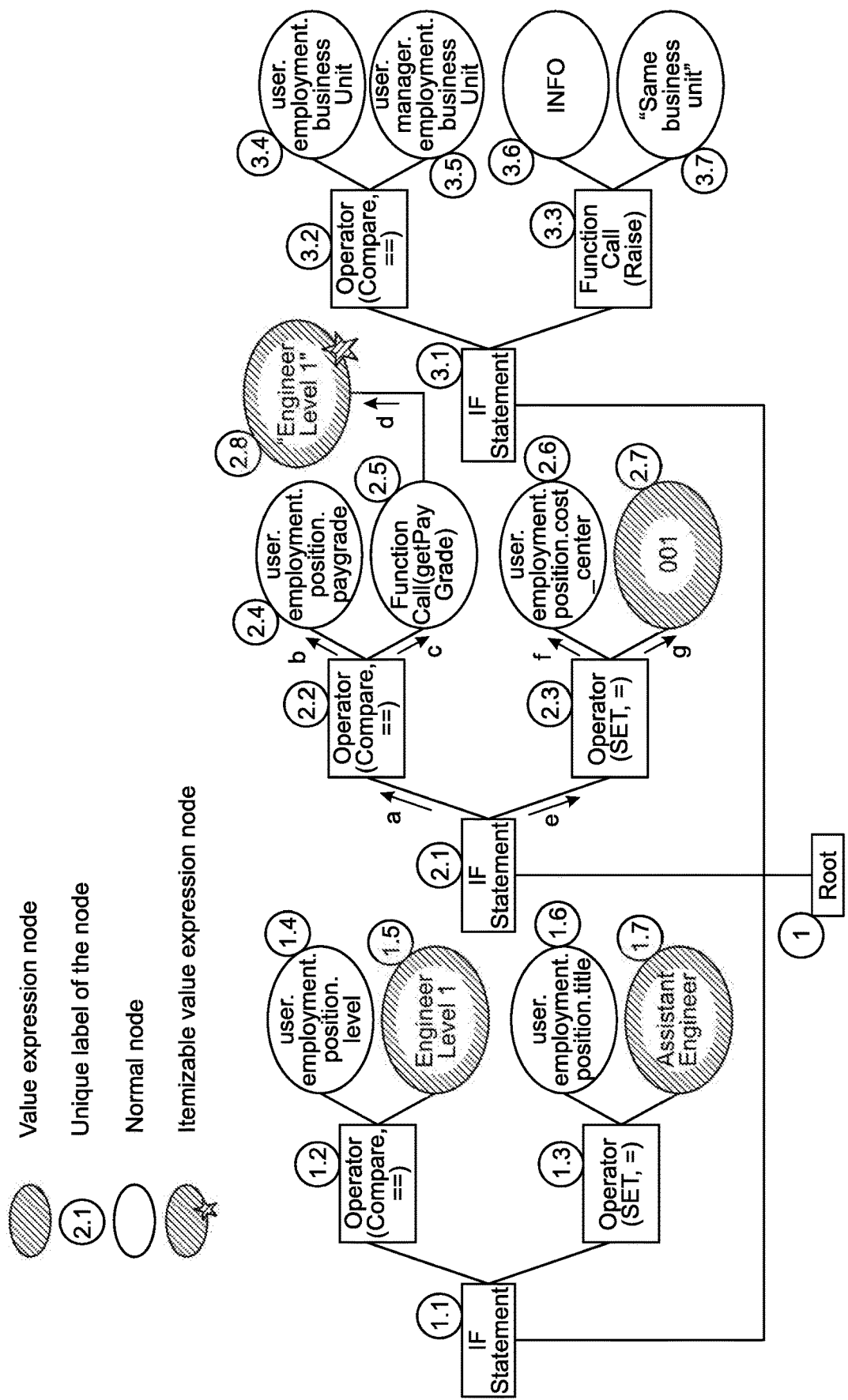
FIG. 12 depicts traversal of the FIG. 10 abstract syntax tree based on the FIG. 8 process according to some embodiments.

As illustrated in FIG. 12, the second branch of the AST is traversed along the path (a,b,c,d,e,f,g). The only value expression of the path is found at node 2.8 (Engineer Level 1'). This node is a literal value, its type is listable, and its parent node 2.5 is a function call. Accordingly, the value expression of node 2.8 is itemizable. Node 2.7 is not an itemizable value expression because, although it is a value expression, its parent node 2.3 is an assignment node. Again, the list for the second rule branch is not empty and the second rule branch is itemizable.

Figure 13:
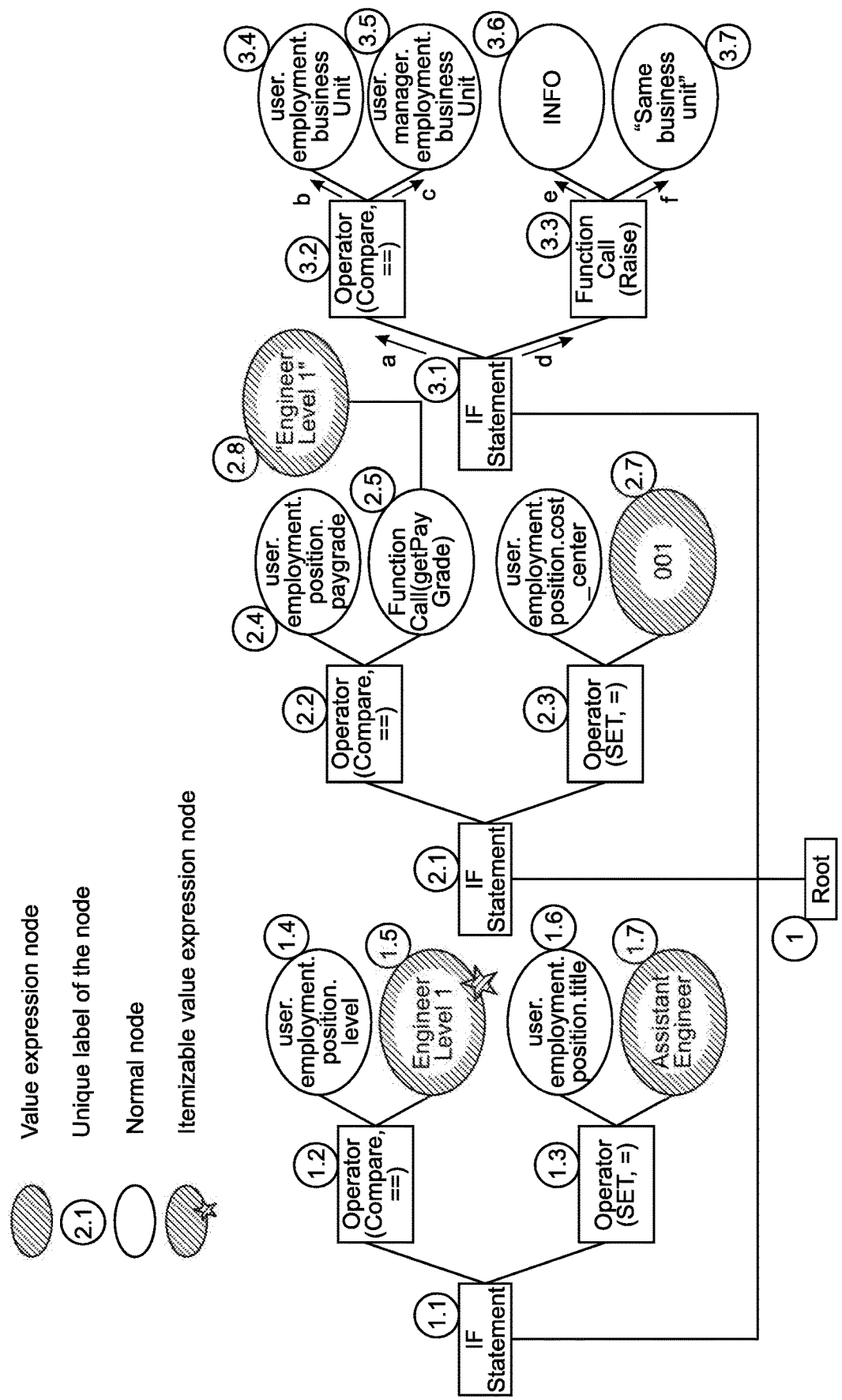
FIG. 13 depicts traversal of the FIG. 10 abstract syntax tree based on the FIG. 8 process according to some embodiments.

The third branch of the AST will be traversed along the path (a,b,c,d,e,f) of FIG. 13. The third branch includes no value expression, so the list is empty and the branch is not itemizable.

Figure 14:
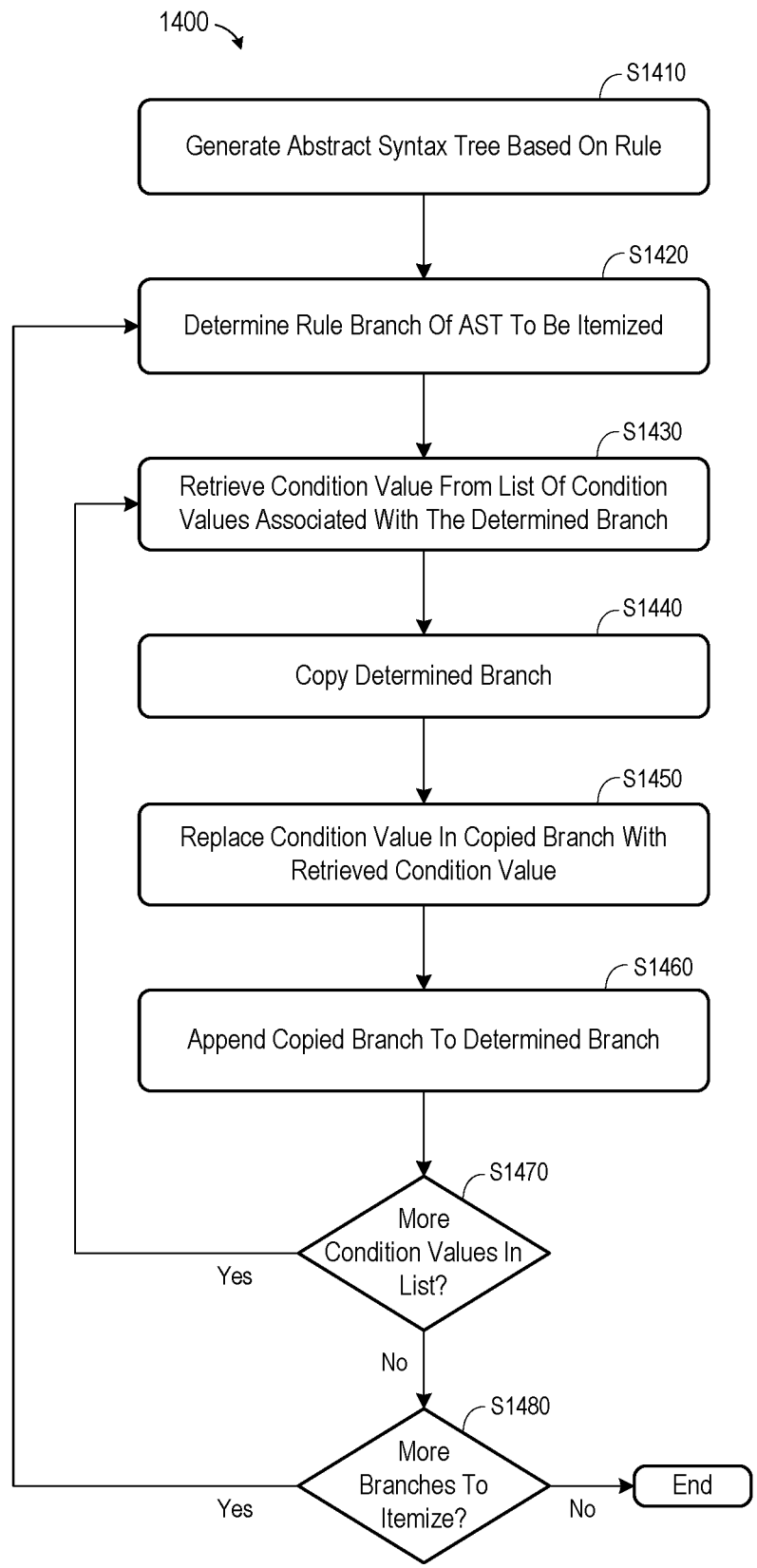
FIG. 14 is a flow diagram of a process to generate rule branches of a rule based on itemizable condition expressions and specified condition values according to some embodiments.

FIG. 14 is a flow diagram of process 1400 to create new rule branches based on itemizable condition expressions and condition values according to some embodiments.

An AST of the rule is initially generated at S1410. A rule branch of the AST to be itemized is then determined at S1420. Next, at S1430, a condition value is retrieved from a list of condition values associated with the determined rule branch. The list of condition values may have been previously specified by a rule designer, for example as described above with respect to FIG. 4.

The determined branch is copied at S1440, and, at S1450, the condition value which is present in the copied branch is replaced with the condition value retrieved at S1430. Next, at S1460, the copied (and now modified) branch is appended to the originally-determined branch. At S1470, it is determined whether the list includes additional condition values. if so, flow returns to S1430 and continues as described above to append another copied-and-modified branch to the determined branch.

Once the list is determined to be exhausted at S1470, flow proceeds to S1480 to determine whether more rule branches remain to be itemized. If so, flow returns to S1420. If not, flow terminates.

Figure 15A:
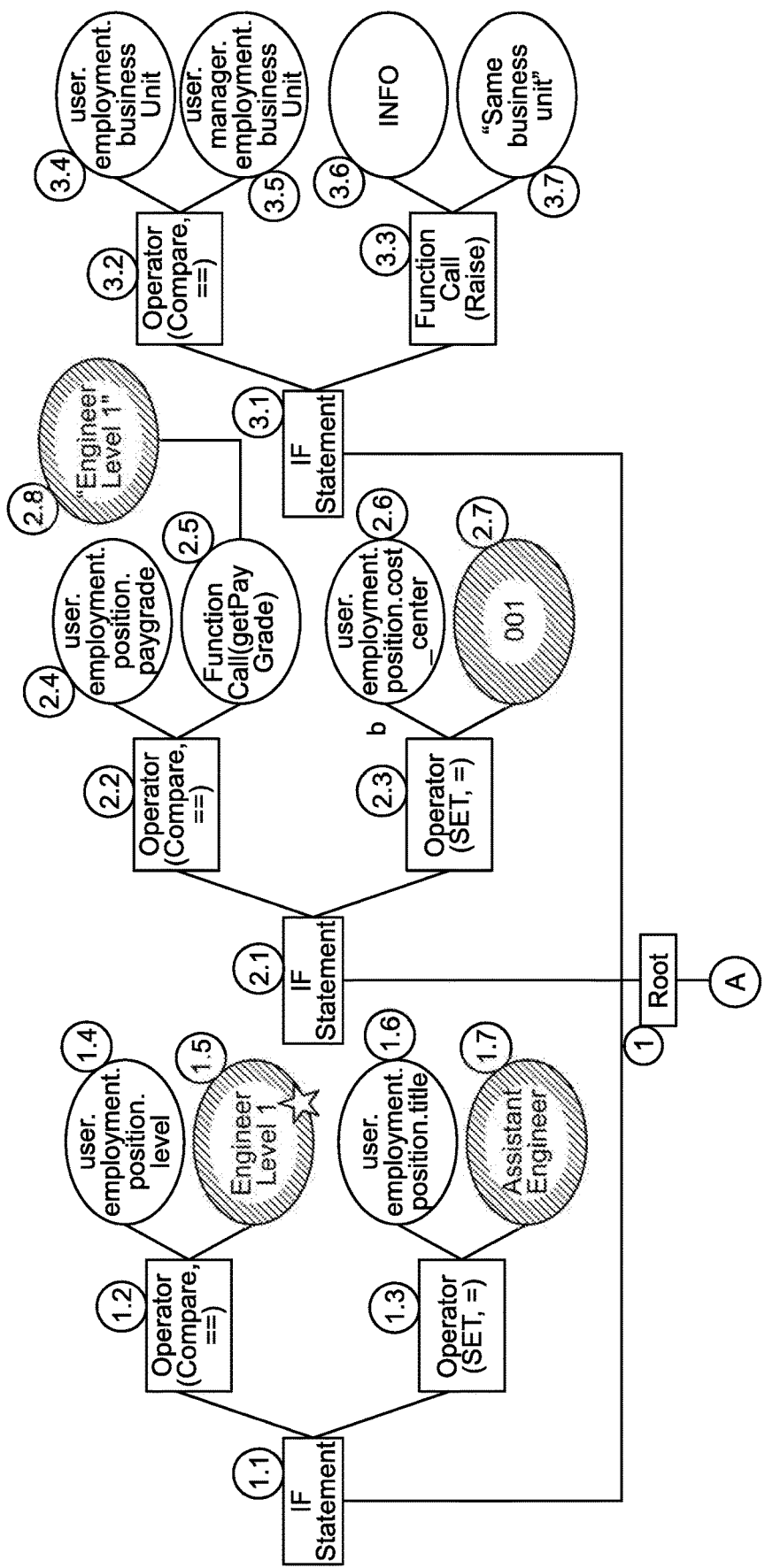
FIGS. 15A and 15B depict an updated abstract syntax tree including itemized condition expressions according to some embodiments.
Figure 15B:
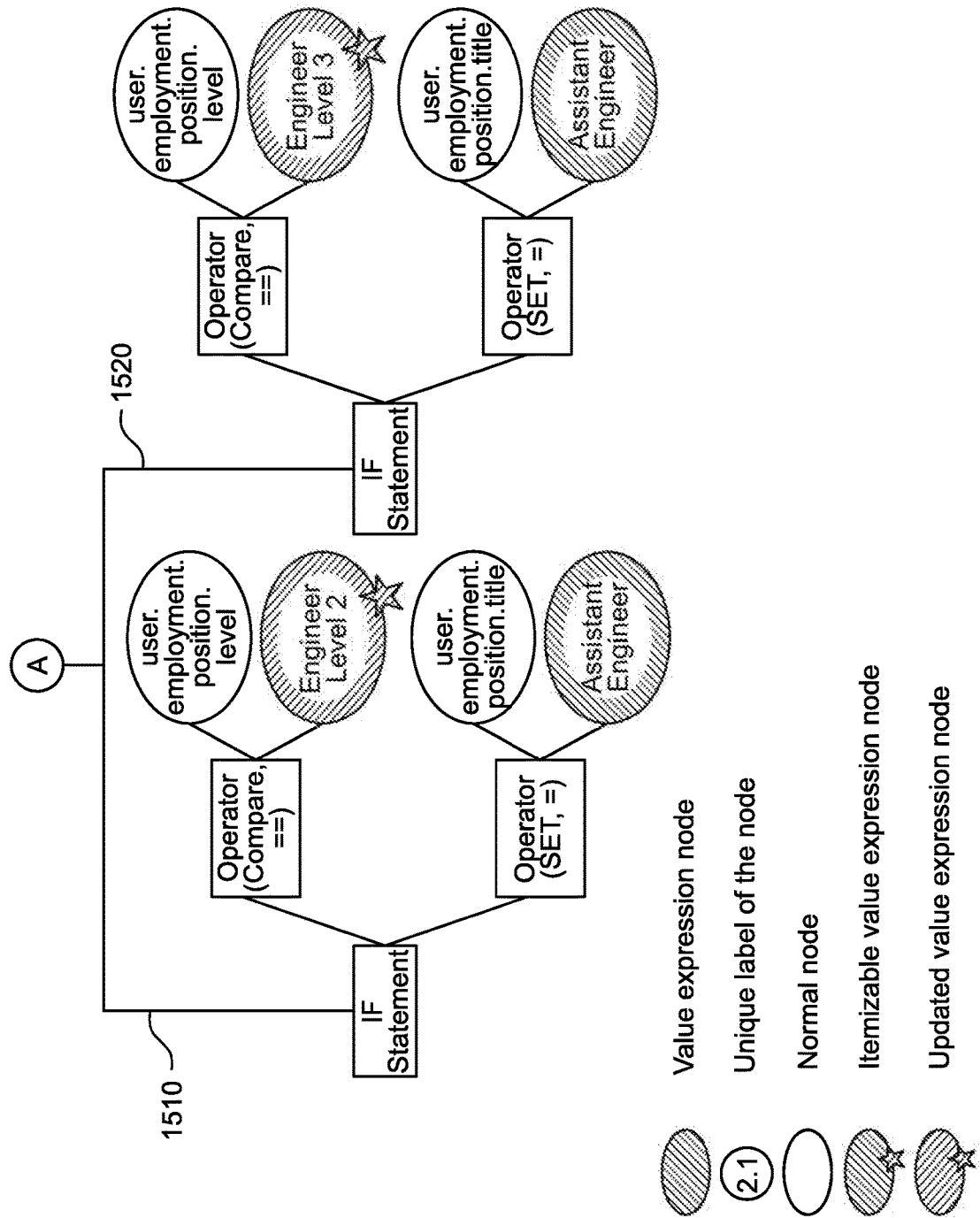

FIGS. 15 and 16 illustrate process 1400 in view of the example of FIGS. 9 through 13. It will be assumed that the first branch of the AST of FIG. 15 is initially selected for itemization, and the specified list of condition values includes "Engineer Level 2" and "Engineer Level 3". Accordingly, two branches 1510 and 1520 are appended to the AST including the updated condition values "Engineer Level 2" and "Engineer Level 3" respectively. FIG. 16 illustrates the two new branches 1610 and 1620 with respect to the original rule of FIG. 9.

Figure 17:
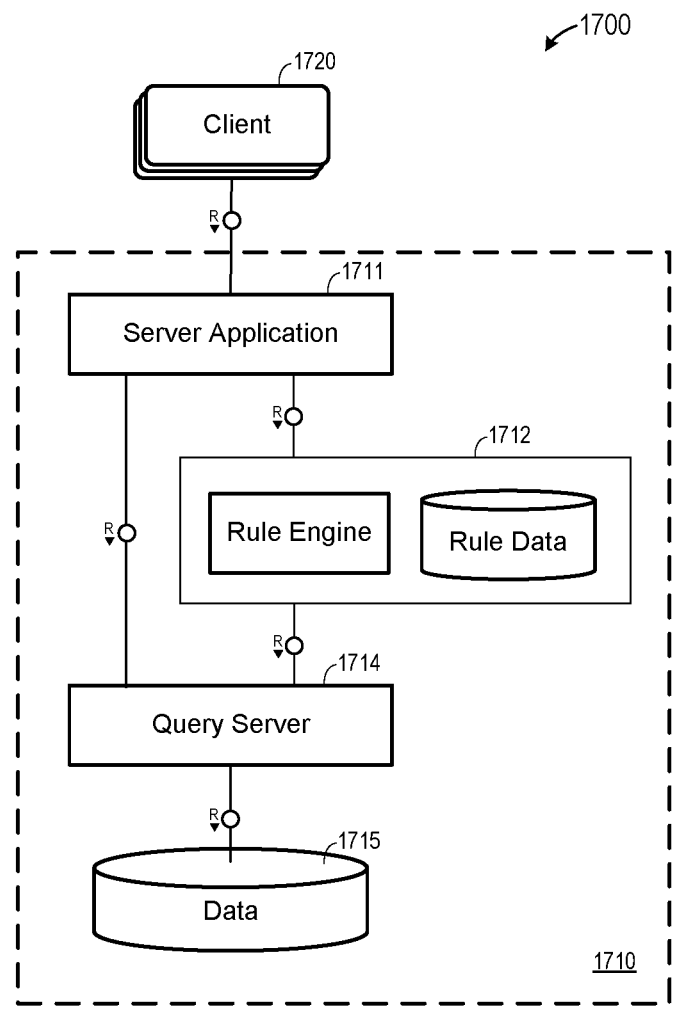
FIG. 17 is a block diagram of a system architecture according to some embodiments.

FIG. 17 is an architecture of system 1700 according to some embodiments. According to system 1700, server application 1711 of platform 1710 receives requests from one of clients 1720 and responds to the requests using rule service 1712 and query server 1714. Server application 1711 may be separated from or closely integrated with query server 1714 and data 1715.

In one specific example, client 1720 executes an application to present a user interface to a user. The user enters a command into the user interface, and client 1720 forwards a request based on the command to server application 1711. In response, server application 1711 may request evaluation of a rule by rule service 1712. The rule may be designed according to one or more of the embodiments described herein. Rule service 1712 may evaluate the rule as is known in the art. Evaluation of a rule may require querying data 1715 via query server 1714.

Data 1715 may comprise one or more of conventional tabular data, row-based data, column-based data, and object-based data. Moreover, the data may be indexed and/or selectively replicated in an index to allow fast searching and retrieval thereof. Data 1715 may support multi-tenancy to separately support multiple unrelated clients by providing multiple logical database systems which are programmatically isolated from one another.

Data 1715 may comprise any query-responsive data source or sources that are or become known, including but not limited to a structured-query language (SQL) relational database management system. Data store 1715 may comprise a relational database, a multi-dimensional database, an eXtendable Markup Language (XML) document, or any other data storage system storing structured and/or unstructured data. Data 1715 may be distributed among several relational databases, dimensional databases, and/or other data sources. Embodiments are not limited to any number or types of data sources.

Data 1715 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Each element of system 1700 may be implemented at least in part in computer hardware, in program code and/or in one or more computing systems executing such program code as is known in the art. Such a computing system may include one or more processing units which execute processor-executable program code stored in a memory system.

Figure 18:
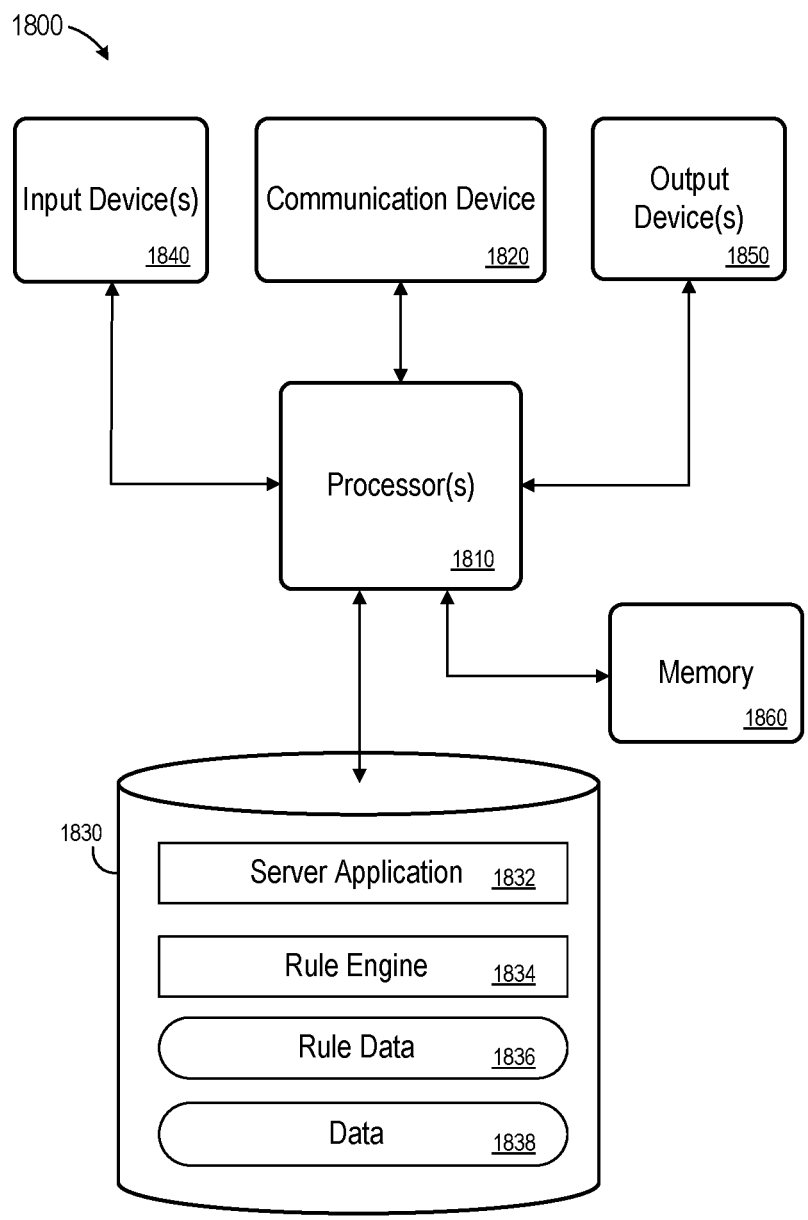
FIG. 18 is a block diagram of an apparatus according to some embodiments.

FIG. 18 is a block diagram of apparatus 1800 according to some embodiments. Apparatus 1800 may comprise a general-purpose computing apparatus and may execute program code to perform any of the functions described herein. Apparatus 1800 may comprise an implementation of platform 1710 in some embodiments. Apparatus 1800 may include other unshown elements according to some embodiments.

Apparatus 1800 includes processor(s) 1810 operatively coupled to communication device 1820, data storage device 1830, one or more input devices 1840, one or more output devices 1850 and memory 1860. Communication device 1820 may facilitate communication with external devices, such as a reporting client, or a data storage device. Input device(s) 1840 may comprise, for example, a keyboard, a keypad, a mouse or other pointing device, a microphone, knob or a switch, an infra-red (IR) port, a docking station, and/or a touch screen. Input device(s) 1840 may be used, for example, to enter information into apparatus 1800. Output device(s) 1850 may comprise, for example, a display (e.g., a display screen), a speaker, and/or a printer.

Data storage device 1830 may comprise any appropriate persistent storage device, including combinations of magnetic storage devices (e.g., magnetic tape, hard disk drives and flash memory), optical storage devices, Read Only Memory (ROM) devices, etc., while memory 1860 may comprise Random Access Memory (RAM), Storage Class Memory (SCM) or any other fast-access memory.

Server applications 1832 and rule engine 1834 may comprise program code executable by processor 1810 to cause apparatus 1800 to perform any one or more of the processes described herein. Embodiments are not limited to execution of these processes by a single apparatus.

Rule data 1836 and data 1838 (either cached or a full database) may be stored in volatile memory such as memory 1860. Rule data 1836 may include rules defined as described above, associated with the data sources of data 1838. Data storage device 1830 may also store data and other program code for providing additional functionality and/or which are necessary for operation of apparatus 1800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a hard disk, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A computing system comprising:
    a storage system storing a plurality of rule definitions, each of the plurality of rule definitions associated with one or more branches, and each branch associated with one or more condition expressions;
    a memory storing processor-executable process steps; and
    one or more processors to execute the process steps to cause the computing system to:

determine a rule branch of a rule, the rule branch comprising a first condition expression including a first condition value;

determine that the first condition expression is itemizable;

in response to the determination that the first condition expression is itemizable, present a user interface for receiving the one or more condition values;

receive one or more condition values associated with the first condition value; and automatically generate a respective rule branch of the rule for each of the one or more received condition values.

2. The computing system according to claim 1, the one or more processors to execute the process steps to cause the computing system to:

in response to the determination that the first condition expression is itemizable, present a control adjacent to the condition expression, the control selectable to invoke the user interface.

3. The computing system according to claim 1, the one or more processors to execute the process steps to cause the computing system to:

determine whether the first condition expression is itemizable by determining whether the first condition value is a value expression and whether the first condition expression includes a function call expression or a comparison expression.

4. The computing system according to claim 3, wherein each of the automatically-generated rule branches includes a respective condition expression including a respective one of the one or more condition values, wherein the first condition expression includes a first object, and wherein each of the respective condition expressions includes the first object.

5. The computing system according to claim 1, wherein each of the automatically-generated rule branches includes a respective condition expression including a respective one of the one or more condition values, wherein the first condition expression includes a first object, and wherein each of the respective condition expressions includes the first object.

6. The computing system according to claim 1, wherein the rule branch comprises a second condition expression including a second condition value, the one or more processors to execute the process steps to cause the computing system to:

receive a second one or more condition values associated with the second condition value; and automatically generate a respective rule branch of the rule for each of the second one or more received condition values, wherein the automatically-generated rule branch for each of the second one or more received condition values includes a respective second condition expression including a respective one of the second one or more condition values, wherein the second condition expression includes a second object, and wherein each of the respective second condition expressions includes the second object.

7. A computer-implemented method comprising:

determining a rule branch of a rule, the rule branch comprising a first condition expression including a first condition value;

determining that the first condition expression is itemizable;

in response to the determination that the first condition expression is itemizable, presenting a user interface for receiving the one or more condition values;

receiving one or more condition values compatible with the first condition expression; and automatically generating a respective rule branch of the rule for each of the one or more received condition values.

8. The method according to claim 7, further comprising:

in response to the determination that the first condition expression is itemizable, presenting a control adjacent to the condition expression, the control selectable to invoke the user interface.

9. The method according to claim 7, further comprising:

determining whether the first condition expression is itemizable by determining whether the first condition value is a value expression and whether the first condition expression includes a function call expression or a comparison expression.

10. The method according to claim 9, wherein each of the automatically-generated rule branches includes a respective condition expression including a respective one of the one or more condition values, wherein the first condition expression includes a first object, and wherein each of the respective condition expressions includes the first object.

11. The method according to claim 7, wherein each of the automatically-generated rule branches includes a respective condition expression including a respective one of the one or more condition values, wherein the first condition expression includes a first object, and wherein each of the respective condition expressions includes the first object.

12. The method according to claim 7, wherein the rule branch comprises a second condition expression including a second condition value, the method further comprising:

receiving a second one or more condition values compatible with the second condition expression; and automatically generate a respective rule branch of the rule for each of the second one or more received condition values, wherein the automatically-generated rule branch for each of the second one or more received condition values includes a respective second condition expression including a respective one of the second one or more condition values, wherein the second condition expression includes a second object, and wherein each of the respective second condition expressions includes the second object.

13. A computing system comprising:

a storage system to store a plurality of rule definitions, each of the plurality of rule definitions is associated with one or more branches, and each branch associated with one or more condition expressions; and a rule designer application to:

determine a rule branch of a rule, the rule branch comprising a first condition expression including a first condition value;

determine that the first condition expression is itemizable;

in response to the determination that the first condition expression is itemizable, present a user interface for receiving the one or more condition values;

receive one or more condition values compatible with the first condition expression; and automatically generate a respective rule branch of the rule for each of the one or more received condition values.

14. The computing system according to claim 13, the rule designer application to:
  in response to the determination that the first condition expression is itemizable, present a control adjacent to the condition expression, the control selectable to invoke the user interface.

15. The computing system according to claim 13, the rule designer application to:
  determine whether the first condition expression is itemizable by determining whether the first condition value is a value expression and whether the first condition expression includes a function call expression or a comparison expression.

16. The computing system according to claim 13, wherein each of the automatically-generated rule branches includes a respective condition expression including a respective one of the one or more condition values,
  wherein the first condition expression includes a first object, and wherein each of the respective condition expressions includes the first object.

17. The computing system according to claim 13, wherein the rule branch comprises a second condition expression including a second condition value, the one or more processors to execute the process steps to cause the computing system to:
  receive a second one or more condition values compatible with the second condition expression; and
  automatically generate a respective rule branch of the rule for each of the second one or more received condition values,
  wherein the automatically-generated rule branch for each of the second one or more received condition values includes a respective second condition expression including a respective one of the second one or more condition values,
  wherein the second condition expression includes a second object, and wherein each of the respective second condition expressions includes the second object.

* * * * *